(12) United States Patent
Wey

(10) Patent No.: US 12,527,971 B2
(45) Date of Patent: Jan. 20, 2026

(54) HIGH EMISSIVITY FAR INFRARED CERAMIC MODULE FOR THERAPEUTIC DEVICE

(71) Applicant: Albert Chin-Tang Wey, Westmont, IL (US)

(72) Inventor: Albert Chin-Tang Wey, Westmont, IL (US)

( * ) Notice: Subject to any disclaimer, the term of this patent is extended or adjusted under 35 U.S.C. 154(b) by 1165 days.

(21) Appl. No.: 17/473,799

(22) Filed: Sep. 13, 2021

(65) Prior Publication Data

US 2023/0080964 A1 Mar. 16, 2023

(51) Int. Cl.
*A61N 5/06* (2006.01)
*C04B 35/10* (2006.01)
*C04B 35/14* (2006.01)
*C04B 35/64* (2006.01)

(52) U.S. Cl.
CPC ............ *A61N 5/0625* (2013.01); *C04B 35/10* (2013.01); *C04B 35/14* (2013.01); *C04B 35/64* (2013.01); *A61N 2005/0632* (2013.01); *A61N 2005/066* (2013.01); *C04B 2235/3217* (2013.01); *C04B 2235/3225* (2013.01); *C04B 2235/3232* (2013.01); *C04B 2235/3239* (2013.01); *C04B 2235/3241* (2013.01); *C04B 2235/3244* (2013.01); *C04B 2235/3251* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3409* (2013.01); *C04B 2235/3418* (2013.01); *C04B 2235/401* (2013.01)

(58) Field of Classification Search
None
See application file for complete search history.

(56) References Cited

U.S. PATENT DOCUMENTS

| | | |
|---|---|---|
| 6,200,537 B1 | 3/2001 | Watanabe et al. |
| 6,402,991 B1 | 6/2002 | Itakura et al. |
| 6,890,457 B2 | 5/2005 | Umehara et al. |
| 7,395,554 B2 | 7/2008 | Kitayama |
| 7,406,956 B1 | 8/2008 | Fujii |
| 7,637,858 B2 | 12/2009 | Miyasaka |
| 7,795,583 B1 | 9/2010 | Hubbard et al. |
| 7,976,934 B2 | 7/2011 | Arai |
| 8,104,455 B2 | 1/2012 | Kitajima et al. |
| 8,176,899 B2 | 5/2012 | Lee |
| 8,285,391 B2 | 10/2012 | Malak |
| 8,389,939 B1 | 3/2013 | Stanley et al. |

(Continued)

*Primary Examiner* — Joseph A Stoklosa
*Assistant Examiner* — Adam J Avigan
(74) *Attorney, Agent, or Firm* — IpHorgan Ltd.

(57) ABSTRACT

This invention relates to a ceramic module for assembly into a therapeutic device for treating a human or animal body with irradiation of far infrared. More specifically, said ceramic module can simultaneously emit blackbody-like thermal radiation and stimulated FIR-photons radiation in 3-16 μm wavelength spectrum, while the overall radiation in 8-14 μm wavelength range is measured to be an approximated blackbody radiation at a temperature that is at least 1° K (or 1° C.) higher than the actual body temperature of said ceramic module, signifying an effective emissivity greater than 1.0. Said ceramic module may be used alone or serve as components of a therapeutic device for increasing physiologic performance, immune competence, health, and mean lifespan of human or animal.

14 Claims, 3 Drawing Sheets

(56) References Cited

U.S. PATENT DOCUMENTS

| | | |
|---|---|---|
| 9,308,388 B2 | 4/2016 | Chau |
| 9,357,963 B1 | 6/2016 | Spahn et al. |
| 9,388,735 B2 | 7/2016 | Wey |
| 9,962,441 B2 | 5/2018 | Vissman et al. |
| 10,272,920 B2 | 4/2019 | Shikii et al. |
| 10,610,699 B2 | 4/2020 | Wey |
| 11,604,098 B2 | 3/2023 | Price et al. |
| 2012/0175526 A1 | 7/2012 | Seo et al. |
| 2021/0123818 A1 | 4/2021 | Wang |
| 2021/0228903 A1 | 7/2021 | Wey |
| 2021/0341337 A1 | 11/2021 | Chevalier |
| 2023/0080964 A1 | 3/2023 | Wey |
| 2023/0204429 A1 | 6/2023 | Wang et al. |
| 2023/0245541 A1 | 8/2023 | Amir et al. |

HIGH EMISSIVITY FAR INFRARED CERAMIC MODULE FOR THERAPEUTIC DEVICE

BACKGROUND

Field of Invention

This invention relates to a ceramic module for assembly into a therapeutic device for treating a human or animal body with irradiation of far infrared radiation. More specifically, said ceramic module simultaneously emits blackbody-like thermal radiation and stimulated FIR-photon radiation in 3-16 μm wavelength spectrum, such that the overall thermal radiation in 8-14 μm wavelength range has an approximated blackbody temperature that is at least 1° K (or 1° C.) higher than the actual temperature of said ceramic module. Said ceramic module may be used alone or serve as components of a therapeutic device for increasing physiologic performance, immune competence, health, and mean lifespan of human or animal.

Description of Prior Art

The emissivity of the surface of a material is its effectiveness in emitting energy as thermal radiation. Thermal radiation is electromagnetic radiation that includes infrared radiation at room temperature. Quantitatively, emissivity, ε, is the ratio of the radiant energy emitted by a surface to that emitted by a blackbody at the same temperature as given by the Stefan-Boltzmann law. The ratio varies from 0 to 1 ($0<\varepsilon<1$). All real objects have emissivities less than 1.0, and emit radiation at correspondingly lower rates. For example, objects like fabric, glass, charcoal, concrete, porcelain, rubber, and sand, all have an emissivity between 0.80 and 0.98.

As far infrared (FIR) radiation becomes a hopeful alternative therapy, numerous inventions have geared towards the development of highly efficient FIR-emitting materials made of metal oxides with a desired emissivity ε>0.9 in mind (i.e., $0.9<\varepsilon<1.0$), while the 1.0-emissivity is well-regarded as an unsurpassable hypothetical limit.

The raw oxides used for making FIR composites usually have an individual emissivity between 0.2 and 0.9, depending on the degree of oxidation and surface preparation. The most commonly used FIR-emitting oxides include aluminum oxide, silicon oxide, zirconium oxide, titanium oxide, magnesium oxide, and so on. All materials are processed to produce a specific shape of composite anticipating to refine FIR radiation rate (emissivity) through sintering. The typical temperatures used for sintering are around two thirds (⅔) of a material melting temperature.

One key aspect in conventional FIR-emitting composite design is to have an emissivity as close to 1.0 as possible. However, most FIR composites in the prior art resulted in only an emissivity around 0.90-0.95 because they treated all constituent oxides equally and indifferently as merely FIR-emitting oxides (for example, U.S. Pat. Nos. 8,285,391, 9,308,388, and 9,962,441, each of which is incorporated by reference in their entireties). None of the prior art targeted emissivity higher than 1.0 because it is generally deemed as a theoretical limit assigned to an ideal blackbody, and thus unreachable.

The present inventor previously shared a similar view, using an FIR-emitting ceramic that requires heating when higher thermal radiation is needed (for example, U.S. Pat. No. 10,610,699, and U.S. Pat Appl. No. 20210228903, both of which is incorporated by reference in their entireties).

However, the present inventor discovered the potential of transition metal oxides (TMO) as a highly efficient FIR radiator, by using them to tune the band gap and lattice constant in the finishing crystal structure so that a high emissivity in 3-16 μm wavelength spectrum might be possible.

Transition Metal Oxides (TMOs)

TMOs constitute probably one of the most interesting classes of solids, exhibiting a variety of structures and properties. The nature of metal-oxygen (M-O) bonding within TMOs can vary between nearly ionic to highly covalent or metallic. The unusual properties of TMOs are clearly due to the unique nature of the outer d-electrons. In particular, the 4s-3d (or 5s-4d) transitions were highly attractive, because they could cover the 3-16 μm FIR spectrum and the wavelength could be tuned by selecting the proper transition metal elements. However, these transitions are electric-dipole-forbidden in the atom and positive ions, based on the spectroscopic selection rule. Thus, a crucial issue was how to enable these 4s-3d (or 5s-4d) transitions so that a high-emissivity FIR composite might be realized.

The present inventor discovered that by placing transition metal ions in a localized inhomogeneous electric field, it was possible to break the symmetry of the crystalline structure, creating a polar structure. In doing so, the electric field can split up the 3d (or 4d) orbital into three sublevels of different energies, designated as σ, π, δ for different angular momentum, thereby enabling electric dipole transitions between 4s-σ and 3d-σ, 4s-σ and 3d-π (or 5s-σ and 4d-σ, 5s-σ and 4d-π).

Given that the transition metals have quite low first ionization potentials, especially towards the left side of the period (e.g., Zr, Ti), these molecules can indeed very well be approximated as ionic molecules. Thus, the desired molecular transitions are basically transitions between the states of transition metal ion, which are somewhat shifted in energy due to the electrostatic interactions between both ions within TMO molecule (i.e., positively $Zr^{2+}$ and negatively $O^{2-}$).

Meanwhile, the easiest way to construct a localized electric field is to arrange a grid of positively charged metal ions and negatively charged oxygen anions. Supplementary transition metal oxides can be added to offer more positive transition metal ions ($Cr^{3+}$, $Ti^{2+}$, $Ni^{2+}$, $Co^{2+}$, $Cu^{2+}$), with respect to oxygen anions ($O^{2-}$) or oxoanions ($SiO_4^{4-}$, $AlSiO^{4-}$). Other doped cations (e.g., $Li^+$, $Na^+$, $K^+$, $Mg^{2+}$, $Ca^{2+}$, $Zn^{2+}$) may also be brought into the grid to strengthen the electric field.

FIR Composite Oxides

Based on the above findings, it is apparent that a desirable FIR-base oxide candidate should locate around the cross point of the 4d-σ and 5s-σ orbitals that is near zirconium. The spectrum of zirconium oxide ($ZrO_2$) is promising, because it has broad, strong band systems in the desired 3-16 μm FIR spectral region, which may also be easily modified by the addition of other transition metal elements. Accordingly, the present inventor concluded that a high emissivity FIR-emitting ceramic composite is possible only when it consists of three parts: (1) hosting oxides, (2) FIR-base oxides, and (3) cation-doping oxides.

HOSTING OXIDES—The purpose of hosting oxides is to prepare a framework for FIR-emitting ceramic system that also contributes to the construction of a negative-charge network for the intended inhomogeneous electric field. As such, the candidates may include the oxides of elements selected from Group 13 and Group 14 in the Periodic Table. The preferred oxides are silicon oxide ($SiO_2$) that offers ($SiO_4^{4-}$) negatively charged ions, or a mixture of silicon oxide ($SiO_2$) and aluminum oxide ($Al_2O_3$) that provides ($AlSiO^{4-}$) oxoanions. Besides, aluminosilicate minerals like kaolin ($Al_2SiO_5$) may be used as a substitute providing the needed negatively charged network of silicon, aluminum and oxygen atoms.

FIR-BASE OXIDES—The second set of oxides serving as a base material for FIR-emitting mechanism is transition metal oxide, which includes the transition metal element selected from Group 3 through Group 12. Particularly, those elements having a partially-filled 3d or 4d atomic orbital are desired. Zirconium oxide in particular plays a key role, while the oxides of other elements such as titanium (Ti), chromium (Cr), manganese (Mn), iron (Fe), cobalt (Co), nickel (Ni), copper (Cu), zinc (Zn), yttrium (Y), or niobium (Nb), may be used to fine-tune the FIR spectrum. Meanwhile, the cations such as $Cr^{3+}$, $Cu^+$, $Cu^{2+}$, $Fe^{2+}$, $Fe^{3+}$, $Zn^{2+}$, and the like can also contribute to building a positively charged network for a localized electric field.

CATION-DOPING OXIDES—The third set of oxides needed are cation-doping oxides. Dopants are added for various reasons such as facilitating sintering, improving the mechanical properties, and changing structural and optical properties. The elements for cation-doping oxides can be selected from Group 1 (alkali metals) or Group 2 (alkaline earth metals). Elements such as lithium (Li), sodium (Na), potassium (K), magnesium (Mg), or Calcium (Ca) are preferred. The doped cations (e.g., $Li^+$, $Na^+$, $K^+$, $Mg^{2+}$, $Ca^{2+}$) may be added into the positively charged network to further strengthen the localized electric field.

As discussed above, an effective FIR-emitting ceramic with a specific spectral luminance within 3-16 μm wavelength spectrum comprises a silicate or aluminosilicate hosting infrastructure blended with selective TMO where the transition metal ions serve as a FIR-radiation site under the influence of a localized inhomogeneous electric field formed by surrounding positively charged ions from diffused cation-doping metal elements against oxygen anions or oxoanions infrastructure within the composite system.

Likewise, certain minerals may be used as a part of the mixture to better serve the intended purpose. For example, kaolinite, andalusite, kyanite, sillimanite, zeolite, cordierite, or the like provide a good source of aluminosilicates for supplying oxoanions, and thus can be used to replace a part of hosting oxides.

Tourmaline is a crystalline boron silicate mineral compounded with elements such as aluminum, iron, sodium, lithium, potassium, and more. It covers almost all elements in the three categories of oxides (hosting oxides, FIR-base oxides, and cation-doping oxide) and is therefore a strong candidate for replacing a part of the final mixture. In addition, its essential pyroelectric property can also strengthen the effect of a localized electric field. Thus, tourmaline has become an important component utilized by the present inventor (for example, U.S. Pat. No. 9,388,735, which is herein incorporated by reference in its entirety).

The synthesis process includes mixing all materials with bonding agents and stabilizers, grinding, drying, forming, green machining, and sintering. The resultant FIR radiation spectrum and its spectral strength (radiation rate, or emissivity) depend on many factors, including but not limited to mixture of selected oxides and their particle sizes, synthesis process incorporating sintering temperature and heating course, and the premeditated polycrystalline structure of the final product.

There are various combinations of the aforesaid factors that may be elected to achieve the anticipated FIR-emitting composite. Nonetheless, the exact effect of cation-doping metal oxides on the FIR-base transition metal oxides embedded in a hosting aluminosilicate infrastructure is complex, difficult to predict and depends on the ion type and concentration. Moreover, a customized synthesis process for the mixture of selected oxides and particle sizes plays a vital role in determining the outcome.

Sintering

Most transition metal oxides used for FIR-emitting composites have a phase transformation temperature in 860-1830° C. To give an example, FIR radiation from zirconia ($ZrO_2$) can be improved and stabilized with phase transformation from monoclinic to tetragonal by sintering at 1170° C. Thus, when zirconium oxide is selected to be the leading TMO, controlled-sintering at a temperature above 1200° C. is required to help align individual dipole moments that results in coherent dipole moments of the finishing system and significantly increases FIR radiation rate.

Sintering is an effective process where porosity is removed from compacted powder particles to form a solid mass, while materials move to pores at grain boundaries by diffusion facilitated by high temperature. The driving force and kinetics of grain growth is mainly influenced by the particle size and grain size distribution. The pores shrink by material diffusing to the empty space creating boundary interface. Higher temperatures generally increase the rate of all sintering mechanisms. Since grain growth is often controlled by surface diffusion, a higher temperature leads to higher densification compared to grain growth. It increases contact area between grains by removing pores and thus enhances ion diffusion and dispersion at grain boundaries. Thus, a heating rate of sintering should be determined by the circumstance that ions from cation-doping metals (e.g., $Li^+$, $Na^+$, $K^+$, $Mg^{2+}$, and $Ca^{2+}$) may freely relocate in the crystal system for re-crystallization and directional grain growth. This helps build up the grid of localized electric field, which strongly influences the proposed 4s-3d (or 5s-4d) orbital electron transitions.

With carefully designed synthesis process parameters, the ensuing composite would produce a blend of crystalline and amorphous regions. Each crystalline region works as a dipole at the transition metal ion site that has an electric dipole moment due to molecular asymmetry. Molecular asymmetry which is a direct result of constituent oxides and accompanying synthesis process determines the chemical properties of the composite system, such as dipole moment and allowed spectroscopic transitions based on the Laporte rule. Meanwhile, the amorphous regions help establish a grid of localized electric field. When such an intrinsic inhomogeneous electric field is presented, the electric dipole transitions between 4s-σ and 3d-σ, 4s-σ and 3d-π, (or 5s-σ and 4d-σ, 5s-σ and 4d-π) within transition metal ions are now allowed.

FIR Emission

In FIR-emitting ceramic systems, heat transfer arises from temperature gradients (i.e., temperature differences caused by absorption of ambient radiation heat) through the diffuse exchange of microscopic kinetic and potential particle energy. It results in dipole oscillation that produces electromagnetic radiation, whose frequency v is dependent of the change in dipole moment, $\Delta U_{dipole}=hv$.

The FIR radiation from the ceramic module of the present invention contains two parts: the traditional blackbody-like thermal radiation from the ceramic surface and the inventive stimulated-FIR-photons radiation generated inside the ceramic body. These two radiations add on to be the overall FIR radiation from said ceramic module, characterizing an effective emissivity greater than 1, ($\varepsilon>1$).

The first part of FIR radiation is the conventional blackbody-like thermal radiation from the surface of said ceramic module. Blackbody radiation is the thermal electromagnetic radiation at the surface of a body in thermodynamic equilibrium with its environment. Blackbody radiation has a characteristic, continuous frequency (wavelength) spectrum that depends only on the body's temperature, called the Planck spectrum or Planck's law. At room temperature most of the emission is in FIR region of the electromagnetic spectrum. The emissivity of the blackbody-like thermal radiation part from said ceramic module can be measured by a commercial FTIR Spectrometer to be about 0.90-0.95.

The second part of FIR radiation, which is the key feature of the present invention, arises from the stimulated FIR-photon radiation from electric dipole transitions between 4s-σ and 3d-σ, 4s-σ and 3d-π (or 5s-σ and 4d-σ, 5s-σ and 4d-π) orbitals within the transition metal ions inside said ceramic module. The allowed states of energy and wave number are still technically quantized, but for large numbers of atoms, these states are so close together that they are considered to be continuous. The stimulated FIR-photon radiation from interior of said ceramic module will join the first part of regular blackbody-like radiation to emerge as the overall thermal radiation from said ceramic module.

Blackbody Radiation

The thermal radiation emitted from the surface of FIR composites by prior art all were approximated as blackbody radiation that follows Planck's law. Planck's law describes the spectral density of electromagnetic radiation emitted by a blackbody in thermal equilibrium at a given temperature, only when there is no net flow of energy between the body and its environment. Also, it is believed in prior art that Planck radiation is the greatest amount of radiation that any body at thermal equilibrium can emit from its surface, whatever its chemical composition or surface structure may be. The passage of radiation across an interface between media can be characterized by the emissivity of the interface while the emissivity of a natural interface is always between 0 and 1 ($0<\varepsilon<1$).

However, when a crystalline structure is present in a FIR composite system that allows atomic transitions to generate photon radiation, quantum mechanics provides a better account, following the principle of detailed balance developed by Albert Einstein. The principle of detailed balance states that at equilibrium, each elementary process is equilibrated by its reverse process. In 1916, Albert Einstein applied this principle on an atomic level to the case of an atom radiating and absorbing radiation due to transitions between two particular energy levels, giving a deeper insight into the equation of radiative transfer and Kirchhoff's law for this type of radiation.

Photons are viewed as the carriers of the electromagnetic interaction between electrically charged elementary particles. Photon numbers are not conserved; photons are created or annihilated in the right numbers and with the right energies to fill the cavity with the Planck distribution. For an ideal blackbody in thermodynamic equilibrium, the internal energy density is entirely determined by the temperature. This is unlike the case of thermodynamic equilibrium, for which the internal energy is determined not only by the temperature, but also independently by the respective numbers and the specific characteristics of the different molecules, because different molecules can carry independently different excitation energies. The rate of change of electron densities in time will be due to three processes: Spontaneous emission, Stimulated emission, and Photon-absorption.

Three parameters, known as the Einstein coefficients, are associated with the photon frequency, v, produced by the transition between two energy levels (states) in each process. Each line in a spectrum has its own set of associated coefficients. As a result, stimulated emissions can be realized by careful design of an inhomogeneous composite system that contrasts to a homogeneous blackbody. This is the reason the present invention utilizes TMO to cause stimulated FIR-photon emissions within the transition metal ions under the influence of a localized electric field.

The FIR composites of prior art are fabricated by treating all ingredient oxides equally and indifferently as FIR-emitting oxides, regardless of the characteristics of each individual oxide and its role in the final composite system. As a result, all prior FIR composites were processed to have a homogeneous crystal structure, guided by both Kirchhoff's law and Planck's law.

In contrast, the present invention synthesizes a ceramic composite according to the properties of each participating oxide to cause an inhomogeneous crystal structure as planned. Predominantly, the present invention treats TMO as a FIR-base material and sinters the mixture of raw materials correspondingly to enable the atomic radiation from 4s-3d (or 5s-4d) and associated hybrid orbital transitions within the transition metal ions. It breaks the symmetry of crystal structure to produce a polar structure that is inhomogeneous in nature. As such, the advantage of choosing "a shaped article" by the present invention over a "powder form" by prior art becomes obvious as described below.

The radiative transfer equation at a point around which the medium is in thermodynamic equilibrium can be written as:

$$dI_v/ds = \alpha(B_v - I_v)$$

where: $\alpha$=absorption coefficient, ds=the distance traveled,
$I_v$=the spectral radiance of the incident beam at the frequency v, and
$B_v(T)$=the spectral radiance of the surface of a body in thermodynamic equilibrium at temperature T (° K).

If the radiation field is in equilibrium with the material medium, then the radiation will be homogeneous (independent of position) so that $dI_v=0$ and $B_v(T)=I_v(T)$, which is another statement of Kirchhoff's law and the teaching of prior art. Based on this understanding, the prior art models the FIR composite as an ideal homogeneous blackbody, and seeks to maximize thermal radiation to equilibrate the radiation heat it absorbs to maintain a thermodynamic equilibrium. However, this concept does not hold in an inhomogeneous environment, as in the present invention.

Stimulated Emission and Measurement of Emissivity

In general, the emissivity and absorptivity are each separately properties of the molecules of the material. They depend differently upon the distributions of states of molecular excitation on the occasion, due to a phenomenon known as "stimulated emission" discovered by Albert Einstein.

Only when the material is in a state known as local thermodynamic equilibrium, the emissivity and absorptivity become equal. On the other hand, factors such as polar crystal structure and localized electric field that cause inhomogeneity can disrupt local thermodynamic equilibrium. An inhomogeneous structure suggests that the atomic radiation from the transition metal elements may outweigh thermal radiation emission and absorption in determining the emissivity of the projected ceramic module, as $dI_v/ds=\alpha(B_v-I_v)$ >0. It implies that the number of FIR photons generated from "stimulated emission" are distance (ds) dependent and can be collected over the thickness of ceramic. Thus, it is beneficial to design the ceramic module as "a shaped article" with a practical thickness, in contrast to the prior art which favors powdered forms to maximize the total radiating surface area for blackbody radiation.

To confirm the featured stimulated FIR-photons radiation of a ceramic module, the thermal radiation can be measured with a VOx (vanadium oxide) thermal imaging device in 8-14 μm wavelength band and the result is approximated as blackbody radiation at a certain temperature to compare to the actual ceramic body temperature in order to determine the effective emissivity.

For example, if the approximated blackbody temperature measured with VOx is higher than the actual ceramic body temperature by 3° K (or 3° C.), the effective emissivity, ε, can be calculated using the Stefan-Boltzmann law:

$$P = A\sigma\varepsilon T^4$$

where P=radiation power, A=surface area,

T=temperature in oK, and σ=Stefan-Boltzmann constant.

For a ceramic module body at room temperature 300° K (27° C.) with a measured blackbody radiation temperature at 303° K (30° C.), the effective emissivity is computed to be 1.04 (ε=1.04).

The motivation behind the ceramic module of present invention is to explore a FIR radiation source having an effective emissivity greater than 1.0 so that it may provide a "non-heating" thermotherapeutic device with which thermal radiation may penetrate deep into the body to create a "stimulated heating" environment simulating a "fever" condition without actually raising the body temperature. More explicitly, said ceramic module will offer blackbody-like radiation at an effective temperature at least 1-3° C. higher than the actual temperature of the body under treatment.

"Fever" Conditions

Fevers are more than just a symptom of illness or infection. Elevated body temperature sets in motion a series of mechanisms that regulate our immune system. When we are healthy, our body temperature tends to stay around a constant 37° C. (98° F.). A slight fever is characterized by a minor rise in body temperature by 1° C. to about 38° C. (100° F.), with larger increases by 3° C. to around 40° C. (104° F.) counting as "high fever."

Elevated body temperature triggers cellular mechanisms that ensure the immune system takes appropriate action against the virus or bacteria. Higher body temperatures drive the activity of certain proteins that switch genes responsible for the body's immune response on and off, as required. A signaling pathway called Nuclear Factor kappa B (NF-κB) plays an important role in the body's inflammation response in the context of infection or disease. NF-κB are proteins that help to regulate gene expression and the production of certain immune cells. These proteins respond to the presence of viral or bacterial molecules in the system, and that is when they start switching relevant genes related to the immune response on and off at cellular level.

Hyperthermia technique is the procedure of raising the temperature of a part of a body above normal for a defined period of time, including low-temperature hyperthermia (e.g., 40° C. for 6 hrs) or moderate-temperature hyperthermia (42-45° C. for 15-60 min). Nonetheless, researchers found that hyperthermia techniques may only generate an average increase of 3.8° C. at a depth of 1 cm, and 0.78° C. at 3 cm. The 3.8° C. increase in the muscle shallows is noteworthy, but the 0.78° C. change at 3 cm depth is clinically trivial. As adipose tissue is a great insulator, almost any amount of fat over the target tissue will render superficial heating pointless.

Increased body temperature has positive effects, such as decreased bacterial growth and stimulation of host defense mechanisms. Fever has been described as assisting the healing process in various ways, including increased mobility of leukocytes, enhanced leukocyte phagocytosis, decreased endotoxin and increased proliferation of T cells. Of course, it also comes with negative effects like increased heart rate, oxygen consumption and metabolism. This is exactly the reason why a FIR therapeutic device of the present invention is necessitated that provides all positive effects with "penetrating heat" for deep tissue treatment of a localized region, but avoids the negative effects associated with increasing the temperature of the entire body.

It is also a common belief that the human body resonates at 9.4 μm wavelength associated with a blackbody radiation at 37° C. temperature. Unfortunately, there is no FIR technique taught by prior art that may provide a non-heating FIR device for helping the body resonating at 38-40° C. to realize a significant biological effect. The ceramic module of present invention provides a possibility of stimulating an effect with 1-3° C. temperature increase in a localized region deep inside the body without raising the temperature of the entire body.

Biochemical Reaction Rates

In addition, FIR photons can be absorbed by the molecules in the body, causing molecular vibrations. As a result, the reactant molecules in a chemical reaction have increased internal energy that reduces activation energy required for a reaction to occur. Consequently, the reaction rate can be significantly enhanced, as governed by the Arrhenius equation described below.

$$k = A \exp(-E_A/RT)$$

where k is the rate constant,

A=pre-exponential factor, $E_A$=activation energy,

R=gas constant, and T=temperature in ° K.

As the temperature (T) increases, the rate of reaction (k) also increases. At a rough approximation for many reactions happening at around room temperature, the rate of reaction doubles for every 10° C. (or 10° K) rise in temperature.

However, a minor temperature increase of 1-3° C. only results in a negligible effect on the chemical reaction rate. Instead, FIR photons radiated from ceramic modules can do much more in enhancing the reaction rate by reducing the activation energy $E_A$, rather than by increasing the reaction temperature T.

To give an example, the oxygen-oxygen (O—O) bond within a hydrogen peroxide ($H_2O_2$) molecule may absorb 11.41 μm wavelength FIR photons to generate stretching vibrations. The corresponding energy is about 10.5 KJ, given by the formula: E (KJ)=120 KJ/λ (μm).

The reduction reaction of hydrogen peroxide to water and oxygen can be written as:

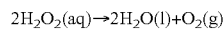

where enthalpy: −196.1 kJ/mol.

The activation energy of the reaction is about 75 kJ/mol in the absence of catalyst. The catalase enzyme (found in blood) may lower the activation energy to below 23 kJ/mol, which corresponds to an increase in the rate of reaction at physiological temperatures by a factor of about 6×10⁸. Absorption of 11.41 μm wavelength photon, which has a radiant energy of 10.5 KJ, further lowers the activation energy to below 12.5 kJ/mol, corresponding to a total increase in the rate of reaction by a factor of $4\times10^{10}$, that represents an additional increase of about hundredfold over the use of catalase enzyme alone.

Hydrogen peroxide is a byproduct of normal oxygen metabolism in the aerobic cells of human and animals. All organisms possess peroxidases or catalase enzymes to break down $H_2O_2$ into water and oxygen. However, the continuous production of $H_2O_2$ contributes to increased concentration of reactive oxygen species (ROS) within both the mitochondrial matrix and cytosol, which is harmful and acts as a burden on living systems. Superoxide and $H_2O_2$ are the primary source of ROS. A variety of inflammatory stimuli, such as lipopolysaccharide (LPS), are thought to cause human diseases through elevating ROS production. Thus, the present invention offers therapeutic potential to block ROS by significantly increasing the reaction rate of the reduction of $H_2O_2$, through irradiation of FIR at 5.95 μm wavelength causing O—H bond bending and 11.41 μm causing O—O bond stretching within $H_2O_2$ molecules.

Similar scenarios can also apply to all activities in human or animal body that involve chemical reactions when increased reaction rates would be helpful. In fact, almost every biological or biochemical effect in our body engages in chemical reactions. There are four major classes of organic macro-molecules within all lifeforms on Earth that are essential to life. They are proteins, lipids, carbohydrates, and DNA/RNA, which are processed from amino acids, fatty acids, sugar residues, and nucleobases, respectively. All processes happen with water hydrolysis.

Hydrolysis is any chemical reaction in which a molecule of water ($H_2O$) breaks one or more chemical bonds. Biological hydrolysis is the cleavage of biomolecules (e.g., proteins, fats, carbohydrates, and polysaccharides) where a water molecule is consumed to prompt the separation of a larger molecule into component parts. The FIR irradiation on water molecules and reactants causing molecular vibrations that lower activation barriers, which can drastically improve the reaction rates and thus the efficiency of hydrolysis.

For instance, ATP (Adenosine Triphosphate) is a molecule that carries energy within cells. All living cells require a continual supply of energy for two main purposes: the biosynthesis of micro and macromolecules, and active transport of ions and molecules across cell membranes. In the human body, the energy derived from the oxidation of nutrients is not used directly, but it is channeled into a special energy-storage molecule, ATP.

The hydrolysis of ATP into ADP and inorganic phosphate (Pi) releases 30.5 kJ/mol of enthalpy, with a change in free energy of 3.4 kJ/mol. The FIR absorption bands of ATP include P—O—P bond stretching at 9.75-11.48 μm and P=O bond stretching at 8.33-9.09 m. Absorption of FIR photons may contribute about 11-15 KJ/mol to the reaction process, which can easily increase the reaction rate by hundredfold.

Under the effect of FIR irradiation, hydrolysis of ATP can effectively provide energy to drive many processes in living cells, including muscle contraction, nerve impulse propagation, and chemical synthesis. With increased energy derived from ATP, cells can operate more efficiently, revitalize themselves, and repair damage.

When the body has enough ATP, it is able to communicate effectively between organ systems, synthesize DNA and RNA, transporting chemicals into and out of cells, produce essential proteins, along with many other critical processes needed for cellular and organism survival.

In addition to being an essential energy source inside cells, ATP also carries critical message between cells, being used in signal transduction pathways for cell communication. For example, cells may be given signals to grow, metabolize, differentiate into specific types, or even die. ATP is one of the body's natural cancer-fighting tools. ATP signaling acts in part to promote apoptosis of the tumor cells and in part to promote cell differentiation, which slows tumor cell proliferation. Laboratory works have shown that ATP can inhibit the growth of tumors, including prostate, breast, colorectal, ovarian and esophageal cancers, and melanoma cells.

As disclosed above, exposure to FIR radiation can improve chemical reaction rates and change the biochemical behaviors of crucial molecules in our body, offering unusual opportunities to improve human health. This new finding urges the need for a reliable, persistent and high efficacy FIR radiation source as proposed by the present invention.

Objects and Advantages

Accordingly, one object of this invention is to provide a ceramic module that emits FIR radiation within 3-16 μm wavelength spectrum;

Another object of this invention is to provide a ceramic module that emits FIR radiation within 8-14 μm wavelength spectrum with an effective emissivity greater than 1;

Another object of the present invention is to provide a ceramic module for assembly into a therapeutic device that simulates a temperature increase of about 1-3° C. in a localized region deep inside the body without raising the temperature of the entire body, in order to effectively improve the health conditions of human or animal body without raising the temperature of the treated body;

Another object of the present invention is to provide a ceramic module for assembly into a therapeutic device that improves the reaction rate of related chemical reactions within the treated body for positive biological effects;

Also, another object of the present invention is to provide a simple, easy-to-use, and maintenance-free therapeutic device that is flexible to attach to any part of human or animal body that requires treatment.

These objectives are achieved by a ceramic module that simultaneously emits blackbody-like thermal radiation and stimulated FIR radiation within 3-16 μm wavelength spectrum, with an effective emissivity greater than that expected from a ceramic module emitting FIR within an 8-14 μm wavelength spectrum. Said ceramic module comprises a shaped ceramic article made of essentially a mixture of powders of selected oxides for different responsibilities in the FIR composite system, including hosting, FIR-emitting, and cation-doping. Said ceramic module may be secured in a flexible attachment means and placed at close proximity of the body part that requires treatment.

Other objects, features, and advantages of the present invention will hereinafter become apparent to those skilled in the art from the following description.

SUMMARY OF THE INVENTION

In accordance with the present invention a ceramic module comprises a mixture of three sets of powders of selected oxides comprising hosting oxides, FIR-base oxides, and cation-doping oxides, said mixture being sintered along with bonding agents at a temperature above 860° C. into a shaped ceramic article to simultaneously emit blackbody-like thermal radiation and stimulated FIR-photon radiation within 3-16 µm wavelength spectrum, with an effective emissivity greater than one particularly in 8-14 µm wavelength range, that provides an effective means to improve health conditions of a human or animal body based on a stimulated virtual fever condition as well as improved chemical reaction rates in the body by absorption of FIR-photons that lead to positive biological effects.

REFERENCE NUMERALS IN DRAWINGS

Figure 1:
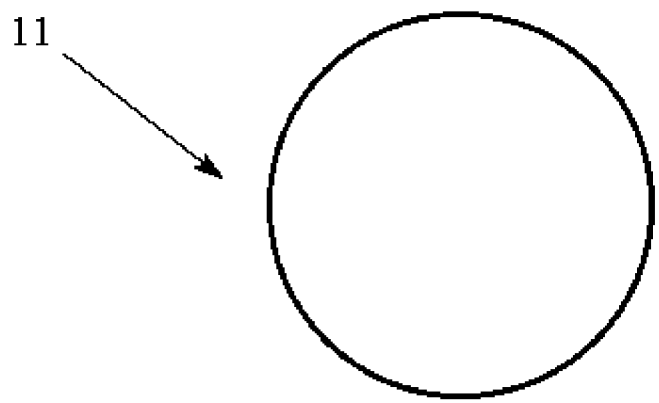
FIG. 1 is a perspective view of a first embodiment of the present invention showing a ceramic module in the shape of a sphere.

| | |
|---|---|
| 11 ceramic module | 21 substrate |
| 22 pockets | |

DETAILED DESCRIPTION OF THE INVENTION

The invention is a therapeutic device, comprising one or more ceramic modules of the present invention, the therapeutic device emitting blackbody-like thermal radiation and stimulated FIR in 3-16 µm wavelength range.

Each said ceramic module is made of a mixture of three sets of oxide powders, including hosting oxides, FIR-base oxides, and cation-doping oxides, with each set of powders having its own assigned responsibility in the final FIR composite system.

The set of hosting oxides is used to prepare a framework for said ceramic module that also contributes to the construction of a negative-charge network for a localized electric field. In particular, oxides of the elements of Group 13 and Group 14 in the Periodic Table may be used for hosting oxides. In at least one embodiment of the present invention, silicon oxide ($SiO_2$) and aluminum oxide ($Al_2O_3$) are used to provide oxoanions of $SiO_4^{4-}$ and $AlSiO^{4-}$ for helping establish the infrastructure of a negatively charged network of silicon, aluminum and oxygen atoms.

The set of FIR-base oxides serves as a base material for FIR photons emission. In particular, oxides of the transition metal elements selected from Group 3 through Group 12, particularly those elements having a partially-filled 3d or 4d atomic orbital may be used as FIR-base oxides. In at least one embodiment of the present invention, zirconium oxide ($ZrO_2$) and/or titanium oxide ($TiO_2$) are used as the FIR-base oxides. In a further embodiment, an FIR-base oxide set comprising zirconium oxide and/or titanium oxide as a majority part may also include as a minority part chromium (Cr), manganese (Mn), iron (Fe), cobalt (Co), nickel (Ni), copper (Cu), zinc (Zn), yttrium (Y), or niobium (Nb), in order to fine-tune the FIR-photons radiation spectrum.

The set of cation-doping oxides are added to the composite system to form positively charged network that supports a localized electric field. In particular, the cation-doping oxides may include oxides of Group 1 (alkali metals) or Group 2 (alkaline earth metals). In at least one embodiment of the present invention, oxides of elements such as lithium (Li), sodium (Na), potassium (K), magnesium (Mg), or Calcium (Ca) may be used.

Once the appropriate oxides are selected, they must be processed into modules for use in a therapeutic device. The process involves mixing all three sets of oxides with bonding agents and stabilizers, grinding, drying, forming, green machining, and sintering. The subsequent FIR radiation spectrum and its spectral strength (i.e. rate of radiation of photons of a given wavelength) depend on many factors, including sintering temperature and heating course with specified heating and cooling rates, and intended polycrystalline structure that enables stimulated FIR photon emission.

Most oxides used for making said ceramic modules have a phase transformation temperature in the range of 860-1830° C. For example, when zirconia ($ZrO_2$) is selected as an FIR-base oxide, it can be stabilized with phrase transformation from monoclinic to tetragonal by sintering at a temperature of 1170° C. Nonetheless, the sintering temperature is also dependent of the particle sizes of the constituent powders and the heating course, which must be determined experimentally.

Generally, larger particles (>200 nm) need a higher temperature to react because the dominant diffusion mechanism during sintering can change with both particle size and shape. In addition, the kinetics of grain growth is also influenced by the grain size distribution. If the distribution is large, the pressure difference between the smaller and larger grains is very high, and, consequently, the growth of larger grains at the expense of smaller ones is much faster than where the distribution is narrow. Thus, for narrow distributions of powder sizes (e.g. about 100-200 nm for nano-powders, or 1-10 µm for micron-particles) and at a sintering temperature around 1240° C. is preferred.

Higher temperatures usually increase the rate of sintering mechanisms. For example, higher temperatures accelerate volume diffusion compared to interfacial diffusion. Since grain growth is often controlled by surface diffusion, while densification is controlled either by volume diffusion or grain boundary diffusion, a higher temperature often leads to higher densification compared to grain growth. Since interfacial diffusion mechanisms are preferred to volume diffusion, it is necessary to use a heating course divided into several steps with predetermined heating rates. In at least one embodiment of the present invention, a heating rate of 2° C./min is used.

Despite such guidelines, the exact effect of cation-doping metal oxides on the FIR-base oxides in the hosting oxide structure is difficult to predict, and it depends on the ion type and concentration. Numerous experiments were performed to observe the influence of thermal heating on material structure at high temperatures, in which the experimental samples were subjected to different heating courses. Through this experimentation, it was determined that as long as the mixture comprises an appropriate number of hosting, FIR-base, and cation-doping oxides, the emissivity is more strongly influenced by the synthesis process than the selection of the constituent oxides in each set.

With carefully chosen synthesis parameters, the resulting ceramic composite produces a blend of crystalline and amorphous regions. Each crystalline region at the zirconium-oxygen (Zr—O) site works as a dipole due to molecular asymmetry that allows the electron transitions between 5s-σ and 4d-σ, or between 5s-σ and 4d-π. The stimulated FIR-photon within 3-16 μm wavelength spectrum is generated, while the spectral frequency and radiation rate are influenced by the presence of other transition metal ions and a localized electric field formed by cation-doping metal ions and oxoanions.

The ceramic module of the present invention, prepared as disclosed herein, has overall FIR radiation that contains both blackbody-like thermal radiation and stimulated FIR-photon radiation that can be approximated as blackbody radiation at a temperature that is at least 1° K or 1° C. higher than the actual body temperature of said ceramic module, signifying an effective emissivity greater than 1.0 ($\varepsilon$>1.0).

Figure 2:
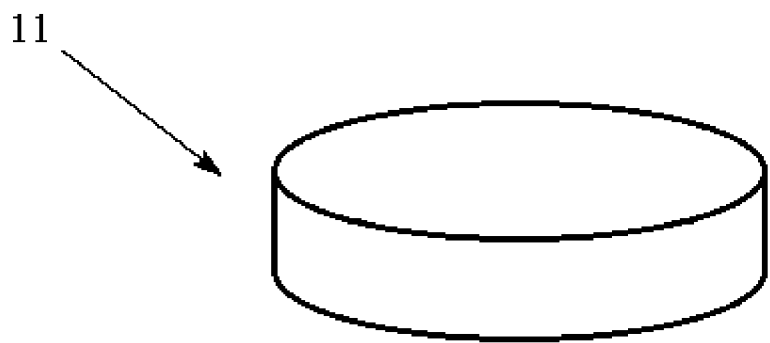
FIG. 2 is a perspective view of a second embodiment of the present invention showing a ceramic module in the shape of a circular plate.
Figure 3:
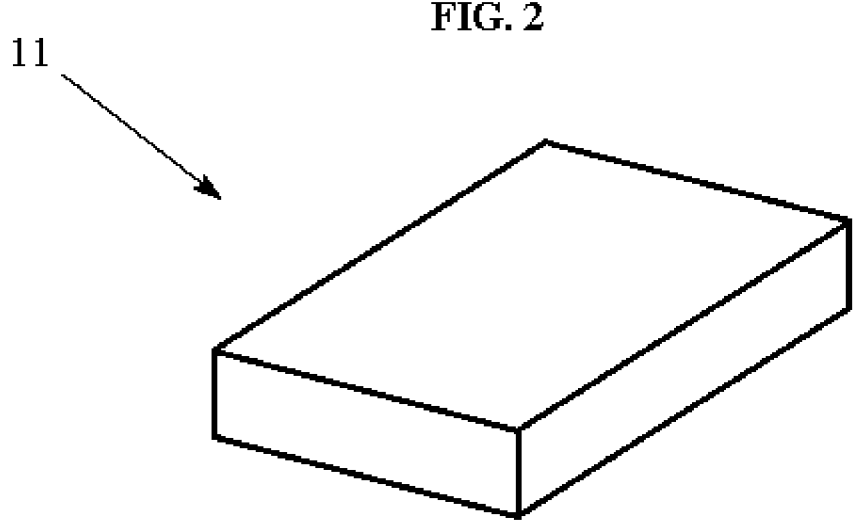
FIG. 3 is a perspective view of a third embodiment of the present invention showing a ceramic module in the shape of a rectangular plate.

FIGS. 1-3 show three separate embodiments of the present invention of varying shapes: in FIG. 1, the ceramic module 11 is shaped as a sphere, in FIG. 2, the ceramic module 11 is shaped as a circular plate, and in FIG. 3, the ceramic module 11 is shaped as a rectangular plate.

The ceramic module(s) 11 of the present invention may be formed into various shapes and sizes, depending upon the particular applications. In at least one embodiment, the IR-emitting elements may be circular in shape, and may be a 2-50 mm diameter circle with a thickness of 1-10 mm. In another embodiment, the IR-emitting elements may be rectangular, having dimensions of a 2 by 3 mm rectangle to a 40 by 50 mm rectangle, with a thickness of 1-10 mm. Rectangular and circular shaped ceramics are generally easier to fabricate than other shapes.

Figure 4:
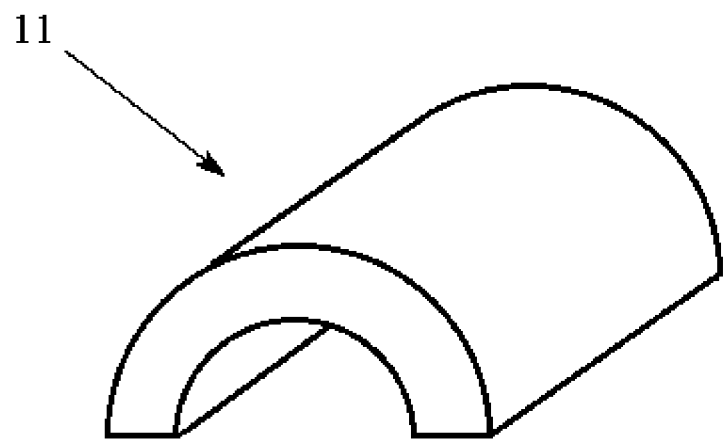
FIG. 4 is a perspective view of a fourth embodiment of the present invention showing a ceramic module in the shape of a partial cylinder.

Nonetheless, it may be advantageous to form the ceramic module 11 with a concave shape. As it can be appreciated, each ceramic module 11 emits blackbody-like thermal radiation from the surface and stimulated FIR-photon radiation from inside the body in all directions. It is anticipated that a concave surface will help focus the rays of radiation emitted by the ceramic module in a region or point at a distance from the surface of the therapeutic device. The focused radiation would penetrate the body with less attenuation than unfocused rays from a ceramic with a flat surface, and would thereby provide an increased therapeutic effect compared to flat ceramics of similar mass and dimensions. The concave surface may take a variety of shapes, such as hemispherical, bowl-shaped, or a partial cylinder. FIG. 4 shows an embodiment of the present invention, in which ceramic module 11 has a partial cylinder shape.

Figure 5:
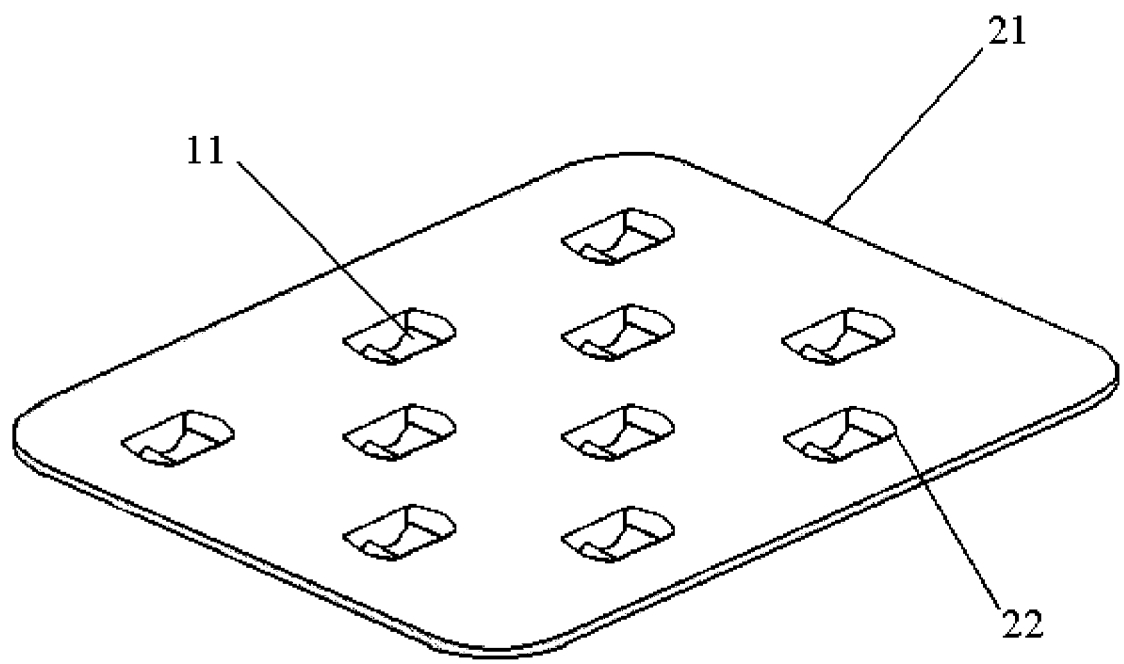
FIG. 5 is a top perspective view of a fifth embodiment of the present invention showing multiple ceramic modules are mounted on a flexible substrate for attaching to a body part to be treated, wherein each of ceramic module has a concave surface facing the body.
Figure 6:
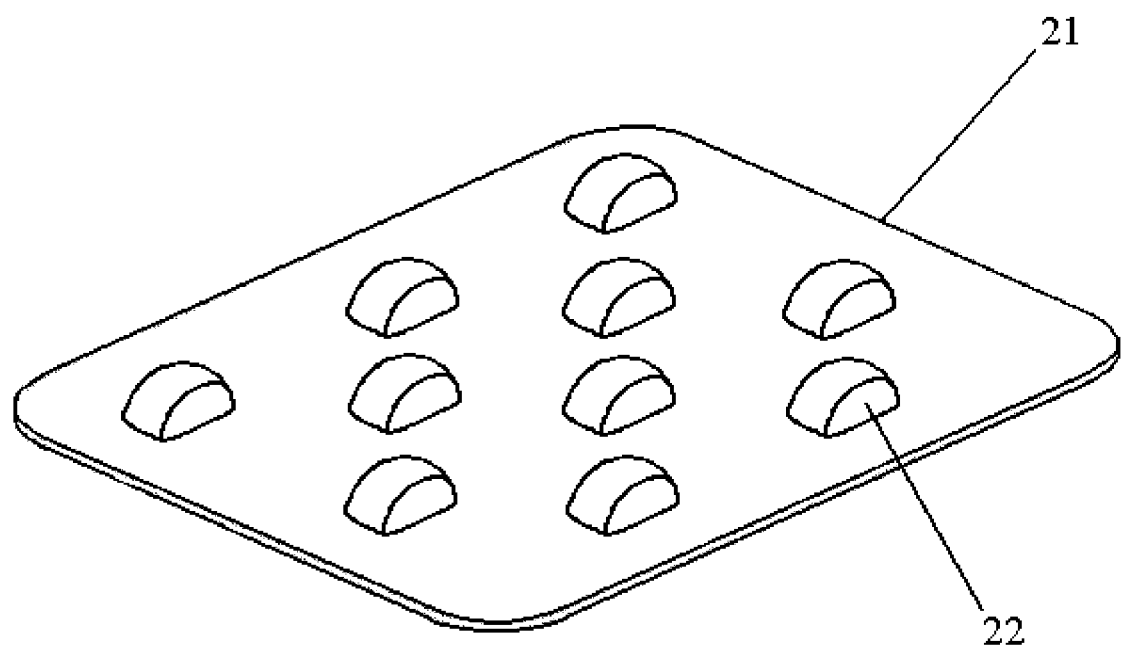
FIG. 6 is a bottom perspective view of the embodiment of FIG. 5, showing the pockets containing the concave ceramic modules.

FIG. 5 shows a preferred embodiment of the present invention, in which multiple ceramic modules 11 are embedded in a substrate 21, which may be made from silicone (polydimethylsiloxane), zinc sulfide, sodium chloride, potassium bromide, or similar materials. The substrate 21 is a substantially flat sheet that includes a number of pockets 22, which are curved protrusions dimensioned to contain ceramic modules 11. FIG. 6 illustrates the underside of substrate 21, which faces away from the body part being treated. In this embodiment, all pockets 22 have the same dimension because all ceramic modules 11 have the same dimensions. In other embodiments, however, pockets 22 may have different sizes or shapes tailored to specific applications or arrangements of variable ceramic modules 11.

Also, the ceramic module 11 in FIG. 5 has a partial cylindrical shape. The partial-cylindrical shaped ceramic module is arranged to have the concave surface facing toward the body part to be treated. This arrangement helps to focus FIR radiation at about one (1) inch above the surface of the device. When the device is wrapped closely around the body during use, the radiation will be focused to a depth of about one inch into the body tissue, and thus significantly enhance the radiation effect in the body.

The embodiments of the invention described thus far are passive devices. The ceramic module 11 absorbs ambient radiation heat and convert the heat into FIR photons. FIR radiation from the ceramic module 11 will last indefinitely, wherever the ambient temperature is greater than Absolute Zero (i.e. 0 deg. K or −273 deg. C.). Obviously, body heat is a natural heat source for ceramic module 11 to emit far infrared radiation.

In experiments, the ceramic modules are made into a shape of ⅓-circumference cutout of a 12-mm long cylindrical tube, with 15-mm I.D. (inner diameter) and 30-mm O.D. (outer diameter). The specific spectral luminance of the ceramic module was measured to cover the 3-16 μm wavelength spectrum. Furthermore, the thermal radiation that adds up blackbody-like thermal radiation and stimulated FIR-photon radiation in 8-14 μm wavelength is measured and approximated as blackbody radiation at a temperature of 39° C., while the actual body temperature of said ceramic modules measured to be only 36° C., indicating a 3° C. virtual temperature increase that signifies an effective emissivity greater than 1.04 ($\varepsilon$>1.04).

All experimental samples were arranged in an array formation as shown in FIG. 5 and secured with polysulfide rubber mold compound. The concave side is arranged to face toward the body to be treated. A penetration depth of about 1 inch into the body is anticipated. The FIR photon radiation absorbed by the body is believed to be carried around through the body by blood circulation for beneficial health effects. Such effects are a direct result of simulated "fever" conditions by a virtual 3° C. temperature increase and improved chemical reaction rates brought by the absorption of stimulated FIR-photon radiation by the reactant biomolecules involved in chemical reactions for biological or biochemical effects.

Encouraging results with the device of present invention have been observed in lab animal experiments and clinical trials, with respect to wounds healing, repair and growth of previously damaged cells, and proliferation of stem cells, compared to controls. Preliminary results from clinical trials also indicate positive effects on the treatment of ulcers, pain, irritable bowel syndrome, Crohn's disease, and neurodegenerative disorders, including traumatic brain injury, stroke, dementia, Alzheimer's disease, Parkinson's disease, and amyotrophic lateral sclerosis (ALS).

CONCLUSION, RAMIFICATIONS, AND SCOPE

According to the present invention, a ceramic module for treating a human or animal body can simultaneously emit blackbody-like thermal radiation and stimulated FIR-photon radiation in 3-16 μm wavelength spectrum, while the overall radiation adds up to have an effective emissivity greater than one ($\varepsilon$>1.0). Said ceramic module may be used alone or serve as components of a therapeutic device for increasing physiologic performance, immune competence, health, and mean lifespan of human or animal.

The invention has been described above. Obviously, numerous modifications and variations of the present invention are possible in light of the above teachings. Such variations are not to be regarded as a departure from the spirit and scope of the invention and all such modifications as would be obvious to one skilled in the art are intended to be included within the scope of the following claims.

I claim:

1. A ceramic module for use in a therapeutic device for treating a human or animal body, said ceramic module comprising:
    a mixture of three sets of powdered substances, the mixture comprising:
    a first set of powdered substance comprising at least one oxide of a first element selected from Group 13 or Group 14 of the Periodic Table of Elements;
    a second set of powdered substance comprising at least one oxide of a second element being a transition metal element with a partially-filled 3d or 4d atomic orbital selected from Group 3 through Group 12 of the Periodic Table of Elements; and a third set of powdered substance comprising at least one oxide of a third element being a metal element selected from Group 1 or Group 2 of the Periodic Table of Elements; wherein as a result of said mixture being sintered at a temperature at or above 860° C., said ceramic module has an inhomogeneous crystal structure whereby the ceramic module emits far infrared radiation covering at least a part of 3-16 µm wavelength spectrum, and
    wherein the overall radiation over the 8-14 µm wavelength range exhibits enhanced infrared emission due to an additional stimulated emission effect within the ceramic module, resulting in a radiative power output comparable to that of an equivalent blackbody radiator at a temperature at least 1° K or 1° C. higher than the actual body temperature of said ceramic module.

2. The ceramic module according to claim 1, wherein said first set of powdered substance includes at least one element selected from boron, aluminum, or silicon.

3. The ceramic module according to claim 1, wherein said second set of powdered substance includes at least one element of titanium, vanadium, chromium, manganese, iron, cobalt, nickel, copper, zinc, yttrium, zirconium, or niobium.

4. The ceramic module according to claim 3, wherein the at least one element of the second set of powdered substance is zirconium.

5. The ceramic module according to claim 1, wherein said third set of powdered substance includes at least one element of lithium, sodium, potassium, magnesium, or calcium.

6. The ceramic module according to claim 1, wherein said mixture of powdered substances further comprises a mineral containing at least one oxide of the first element.

7. The ceramic module according to claim 1, wherein said mixture of powdered substances further comprises a mineral containing at least one oxide of the second element.

8. The ceramic module according to claim 7, wherein the at least one mineral is tourmaline.

9. The ceramic module according to claim 1, wherein due to said additional stimulated emission effect, said overall radiation in the 8-14 µm wavelength range is 1.02 times greater than an equivalent blackbody at the same temperature.

10. The ceramic module according to claim 1, wherein said ceramic module is configured such that due to the additional stimulated emission effect said overall radiation within the 8-14 µm wavelength range is equivalent to a blackbody radiator at a temperature of at least 2° K or 2° C. higher than the actual body temperature of said ceramic module.

11. The ceramic module according to claim 1, wherein said ceramic module is configured such that due to the additional stimulated emission effect said overall radiation within the 8-14 µm wavelength range at a temperature around 36° C. is equivalent to a blackbody radiator whose temperature is at least 38° C.

12. The ceramic module according to claim 1, wherein said ceramic module is rectangular, circular, cylindrical, or spherical in shape.

13. The ceramic module according to claim 1, wherein said ceramic module is mounted on a flexible substrate for attaching to a body part to be treated.

14. A method of manufacturing a ceramic module for use in a therapeutic device for treatment of a human or animal body part, comprising:
    a) providing a predetermined amount of a first set of powdered substance comprising at least one oxide of a first element selected from Group 13 or Group 14 of the Periodic Table of Elements;
    b) providing a predetermined amount of a second set of powdered substance comprising at least one oxide of second element selected from Group 3 through Group 12 of the Periodic Table of Elements;
    c) providing a predetermined amount of a third set of powdered substance comprising at least one oxide of a third element selected from Group 1 or Group 2 of the Periodic Table of Elements;
    d) mixing said first, second, and third sets of powdered substances with bonding agents and stabilizers;
    e) sintering the mixture of step d) at a temperature at or above 860° C. into a shaped article;
    wherein as a result of sintering, the article is capable of emitting far infrared radiation within 3-16 um wavelength spectrum, and
    wherein the overall radiation over the 8-14 µm wavelength range exhibits enhanced infrared emission due to an additional stimulated emission effect within the ceramic module, resulting in a radiative power output comparable to that of an equivalent blackbody radiator at a temperature at least 1° K or 1° C. higher than the actual body temperature of said ceramic module.

* * * * *